United States Patent [19]
Rand

[11] 3,942,865
[45] *Mar. 9, 1976

[54] PORTABLE TELESCOPE

[76] Inventor: Alan E. Rand, 6479 Peachtree Industrial Blvd., Atlanta, Ga. 30340

[ * ] Notice: The portion of the term of this patent subsequent to Oct. 8, 1991, has been disclaimed.

[22] Filed: Sept. 23, 1974

[21] Appl. No.: 508,046

Related U.S. Application Data

[63] Continuation of Ser. No. 229,341, Feb. 25, 1972, Pat. No. 3,840,284.

[52] U.S. Cl. ................................................. 350/83
[51] Int. Cl.² ......................................... G02B 23/16
[58] Field of Search ................................ 350/82–85

[56] References Cited
UNITED STATES PATENTS

| | | | |
|---|---|---|---|
| 1,045,142 | 11/1912 | Hartness | 350/83 X |
| 1,118,564 | 11/1914 | Lupton | 350/83 |
| 2,967,458 | 1/1961 | Stone | 350/85 X |

Primary Examiner—David H. Rubin
Attorney, Agent, or Firm—Jones, Thomas & Askew

[57] ABSTRACT

A portable telescope assembly comprising a telescope mounted on portable support means. The portable support means includes a polar axis shaft, means for aligning the polar axis shaft parallel to the polar axis of the earth, means for revolving the telescope about the polar axis shaft, and means for rotating the telescope about an axis normal to the polar axis shaft. In addition, the polar axis shaft is balanced both torsionally and longitudinally with the telescope supported at one end and to one side of the polar axis shaft, with a fulcrum intermediate the ends of the polar axis shaft, and counterweights supported at the other end and on the other side of the polar axis shaft. The portable support means includes an air suspension system so that the assembly can be transported between erection sites without substantial hazard of damage due to vibrations or shocks.

5 Claims, 10 Drawing Figures

PORTABLE TELESCOPE

CROSS REFERENCE TO RELATED APPLICATION

This application is a continuation of U.S. application Ser. No. 229,341, filed Feb. 25, 1972, now U.S. Pat. No. 3,840,284, issued Oct. 8, 1974.

BACKGROUND OF THE INVENTION

For a large telescope to follow or track stars, etc. as the earth rotates, telescopes have been mounted on support structures that continuously move the telescope about a polar axis which is substantially parallel to the earth's polar axis so that the rotation of the earth will not require continual readjustments of the telescope. In the past, the larger telescopes have been designed for and erected at permanent latitudinal locations because of their large size and weight and because of the difficulty of aligning and maintaining the polar axis of the telescope support assembly. The large telescope installations usually include a massive amount of metal and concrete for the purpose of anchoring and supporting the telescope and its various associated components in a permanent location.

While virtually all large telescopes can be moved with their support systems so as to rotate with respect to the earth's surface and change their angle of elevation to sight on and track various stars, etc., the telescopes are limited in that they cannot track an object near or below their horizon of the earth. This preludes the telescope from sighting on objects visible only at remote latitudes. Thus, even the most powerful, most accurate and most expensive telescope may be useless because of its permanent location if the object to be sighted happens to be inaccessible to the line of sight from the particular latitude on the earth at which the telescope is located. Moreover, on many occasions permanently mounted telescopes are rendered useless because of cloud coverage, air pollution or other local atmospheric conditions. Also, the precession and nutation of the earth necessitates frequent realignment of the polar axis of the telescope with the earth's polar axis, and the realignment process is delicate and onerous.

SUMMARY OF THE INVENTION

Briefly described, the present invention obviates the foregoing problems by providing a portable telescope assembly which can be transported to different locations on the earth to change the latitude location of the assembly, and the support system of the assembly can be expediently oriented to define a polar axis parallel to the earth's polar axis and the telescope can revolve 360° about its polar axis so as to continuously track stars or other celestial objects without having to be repositioned. The telescope of the assembly includes both a Casagrain focus and a Newtonian focus, and the telescope housing is rotatable about its longitudinal sight axis so that the Newtonian focus can be oriented at a convenient position for the astronomer or his photographic equipment, etc. The assembly is balanced so that the telescope is maintained in balance when in operation and when being transported between its sites of erection. In one embodiment of the invention the polar axis shaft of the support system includes a sighting system wherein Polaris, the North Star, and its companion star can be viewed through the polar axis shaft.

Thus, it is an object of the present invention to provide a portable telescope assembly which is versatile, expediently set up for operation, which can be transported between sites of erection, and which is as powerful as some of the larger telescope assemblies which are permanently mounted.

Other objects, features and advantages of the present invention will become apparent upon reading the following specification, when taken in conjunction with the accompanying drawing.

DESCRIPTION OF PREFERRED EMBODIMENTS

Figure 1:
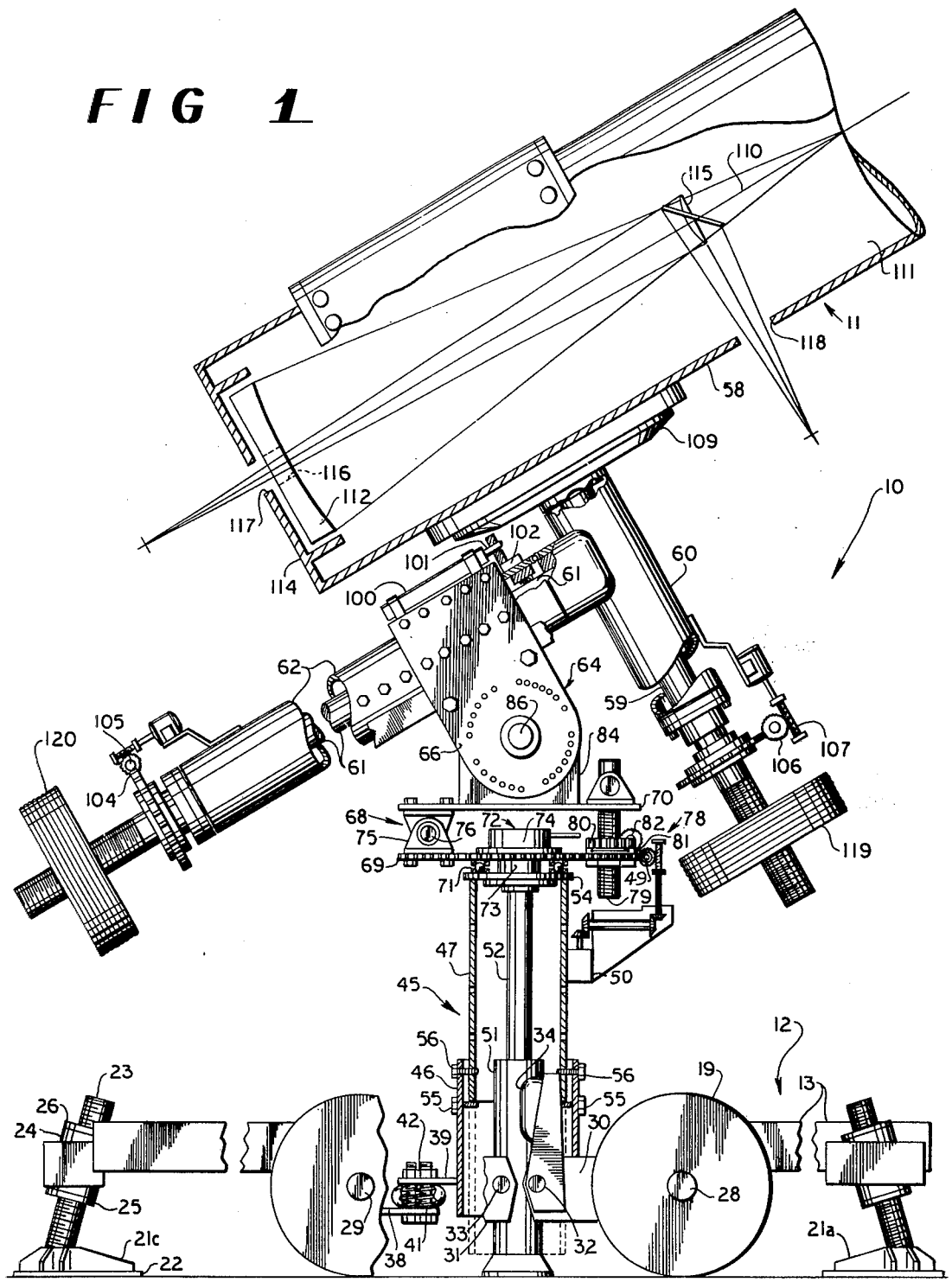
FIG. 1 is a side elevational view of the telescope assembly, with parts shown in section for clarity.

Referring now in more detail to the drawing, in which like numerals indicate like parts throughout the several views, FIG. 1 shows portable telescope assembly 10 which generally includes telescope 11 and portable support system 12. Portable support system 12 includes support frame 13 having a pair of spaced-apart parallel side support beams 15 and 16 (FIG. 3), and a plurality of connecting cross beams, such as end crossing beam 17 and middle crossing beam 18. Support frame 13 is portably supported by support wheels 19, and when the telescope assembly is to be erected for sighting purposes, support feet 21 are lowered to engage the ground and support the support frame 13. Support feet 21 comprise three support feet assemblies 21a, 21b and 21c (FIG. 3), and each of the support feet comprises a foot 22 for resting on the ground surface, and externally threaded leg 23 pivotally connected to its foot 22, sleeve 24, lower internally threaded elevating ring 25 and upper internally threaded lock ring 26. Sleeve 24 is rigidly connected to support frame 13 at an angle inclined from the vertical toward the vertical centerline of support frame 13. When the support feet 21a, 21b and 21c are to be lowered so as to engage the ground and support the assembly, each lock ring 26 is rotated about its externally threaded leg 23 away from sleeve 24, and each elevating ring 25 is rotated in the same direction so as to move up the leg, thus causing its foot 22 to move in a downward direction away from the support frame 13. When the three support feet properly support the support frame, and when the support frame is level, the upper lock ring 26 of each support foot is threaded back in the opposite direction so as to engage and wedge against the upper end of its sleeve 24, thus locking the support feet and the support frame will be held in a level attitude. The angle of each leg 23 is such that the axes of all the legs come to an apex position above the center of gravity of the telescope assembly.

The wheels 19 are each connected at the ends of axles 28 and 29 which extend across and are spaced below support frame 13. As is illustrated in FIG. 1, axles 28 and 29 are connected at their ends to the horizontally extending legs of L-shaped pivot plates, such as pivot plates 30 and 31 in FIG. 1. There is a pivot plate for each wheel 19, and each pivot plate is freely rotatable about its pivot pin, such as pivot pins 32 and 33 of FIG. 1. Compression bags such as compression bag 34 of FIG. 1 are positioned between the upwardly extending legs of the L-shaped pivot plates on each side of support frame 13. The compression bags are fabricated from a resilient material and filled with a fluid, such as air or water. The compression bags on each side of support frame are urged toward each other by the weight of the assembly tending to pivot the wheels 19 on each side of the assembly in an upward direction about the respective pivot pins. Thus, compression bags 34 function as a compressible fluid supporting means to support support frame 13.

Figure 2:
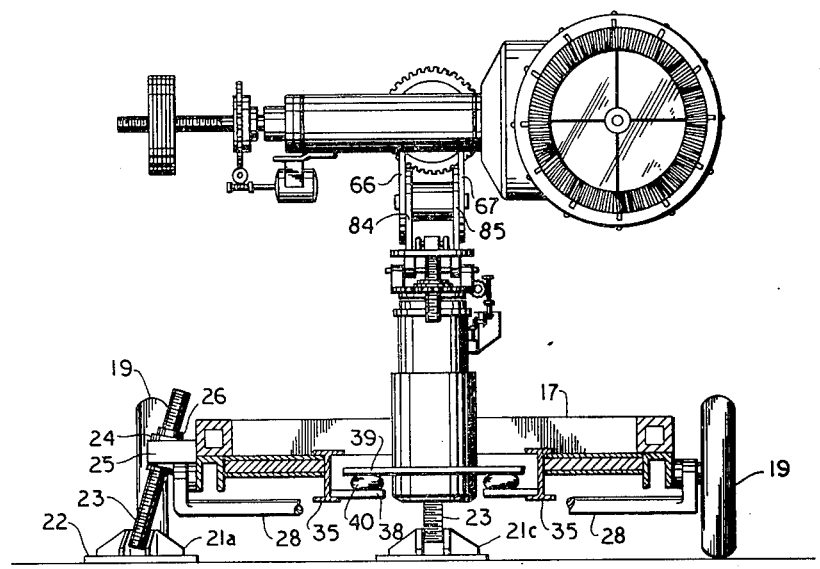
FIG. 2 is an end view of the telescope assembly, with parts broken away.
Figure 3:
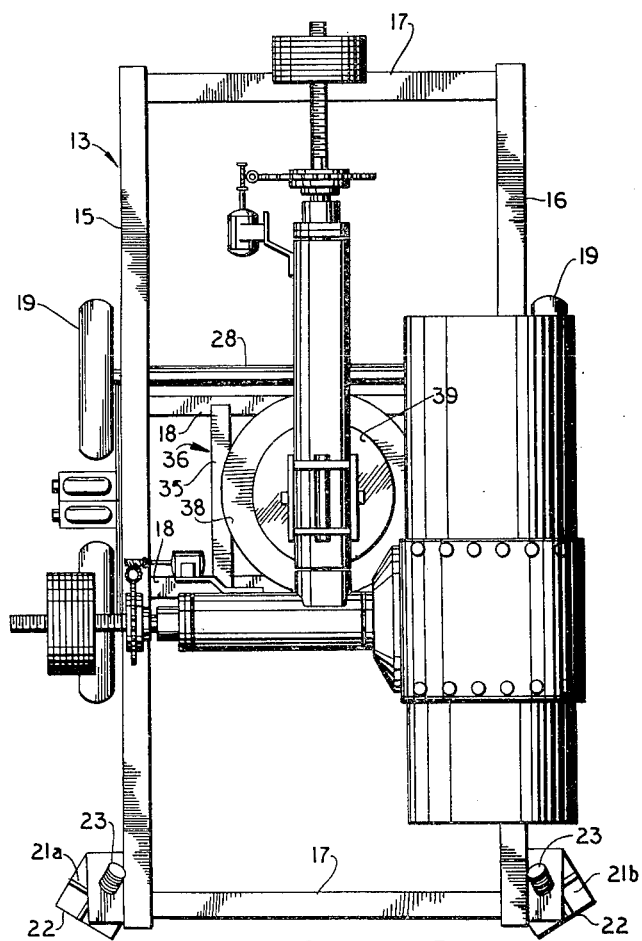
FIG. 3 is a top view of the telescope assembly.

As is illustrated in FIGS. 2 and 3, middle longitudinal beams 35 extend between the middle crossing beams 18, and together with the middle crossing beams form a center framework 36. A lower annular support ring 38 is supported by center framework 36 and is located about the vertical centerline of support frame 13. Upper support ring 39 is positioned above lower support ring 38, and a plurality of compression bags 40 are interposed between support rings 38 and 39. Compression bags 40 are fabricated from a resilient material and are filled with fluid, such as air or water, and the compression bags can be of doughnut or annular configuration, if desired. A plurality of coil compression springs 41 are also interposed between the support rings 38 and 39, and rigidifying lock bolts extend through both support rings. When the lock bolts are loosened the compression bags 40 and coil compression springs 41 will function as a suspension system to support the telescope 11 from support frame 13. When the lock bolts are tightened, the support rings are more securely fastened to one another and the movement of the telescope with respect to support frame 13 is eliminated.

Upper support ring 39 surrounds the vertical centerline of lower support frame 13, and a telescoping pier assembly 45 is connected to and extends upwardly from upper support ring 39. Telescoping pier assembly 45 includes lower tubular pier member 46 which is rigidly connected to upper support ring 39, and upper inner tubular pier member 47. Upper pier member 47 is supported by lower pier member 46. Detachable jack 51 is insertable inside lower pier member 46, and its rod 52 is engageable with the upper horizontal platform 54 of upper pier member 47 so as to raise and lower the upper pier member 47 with respect to its lower pier member 46. Once the upper pier member 47 has been raised by means of jack 51, supporting screws 55 can be inserted through lower pier member 46 and support upper pier member 47, and setscrews 56 can be tightened to form a friction fit between upper pier member 47 and its lower pier member 46.

Telescope 11 comprises a housing 58 connected to a delcination axis shaft 59, the declinationaxis shaft is housed in declination axis shaft case 60, and declination axis shaft case 60 is rigidly connected to one end of polar axis shaft 61. Polar axis shaft 61 is supported in polar axis shaft case 62, and clevis assembly 64 is connected to polar axis shaft case 62. Clevis assembly 64 composes a part of latitude adjustment section 68 and comprises a pair of spaced-apart flat plates 66 and 67 which are rigidly connected at their upper ends to polar axis shaft case and which protrude downwardly from polar axis shaft case toward telescoping assembly 45.

Latitude adjustment section 68 comprises lower support platform 69 and upper support platform 70. Lower support platform 69 rests on upper platform 54 of telescoping pier assembly 45 and is rotatable thereon by means of bearing assembly 71. Lock nut assembly 72 includes an externally threaded screw 73 extending upwardly from upper platform 54 of pier assembly 45 and lock nut 74 positioned on the top surface of lower support platform 69 of latitude adjustment section 68, so that upon tightening lock nut 74 about its screw 73, a frictional lock is formed between lower platform 69 of latitude adjustment section 68 and upper platform 54 of pier assembly 45.

The peripheral surface of lower platform 69 is circular and gear teeth protrude therefrom so that the lower platform functions as a worm gear for driving motor 50 and worm 49. Motor 50 is supported by upper pier member 47 and the rotation of its worm against worm gear or lower platform 69 provides a power assist to the rotation of the telescope about the vertical axis.

Upper support platform 70 of latitude adjustment section 68 is hingedly connected to lower platform 69 by means of hinge assembly 75 which composes a part of fine adjustment assembly 78 and comprises a hinge pin 76 inserted through the openings in the mating hinge elements connected to the respective platforms. Hinge assembly 75 is placed to the side of pier assembly 45. On the other side of the pier assembly from hinge assembly 75, fine adjustment assembly 78 includes externally threaded screw 79 connected at its upper end to upper support platform 70 and extending downwardly through lower platform 69. Internally threaded elevating ring 80 surrounds externally threaded screw 79 and through its bearing 81 bears against lower support platform 69. Elevating ring 80 is also externally threaded, and motor driven gear 82 functions to rotate elevating ring 80 with respect to its screw 79. When the elevating ring 80 is driven in one direction, upper support platform 70 tends to move in an upward direction away from lower support platform 69 in its area adjacent screw 70 so that it tends to pivot about hinge pin 76 of hinge assembly 75. Of course, when elevating ring 80 is driven in the opposite direction, upper support platform 70 will move downwardly about hinge pin 76. Thus, fine adjustments are made in the fine adjustment assembly 78 of latitude adjustment section 68.

A pair of upstanding platform plates 84 and 85 extend upwardly from upper support platform 70 and are spaced apart so as to be received between plates 66 and 67 of clevis assembly 64. Pivot pin 86 extends through aligned openings defined in plates 66, 67, 84 and 85, so that clevis assembly 64 is freely rotatable with respect to the upstanding plates 84 and 85.

Figure 4:
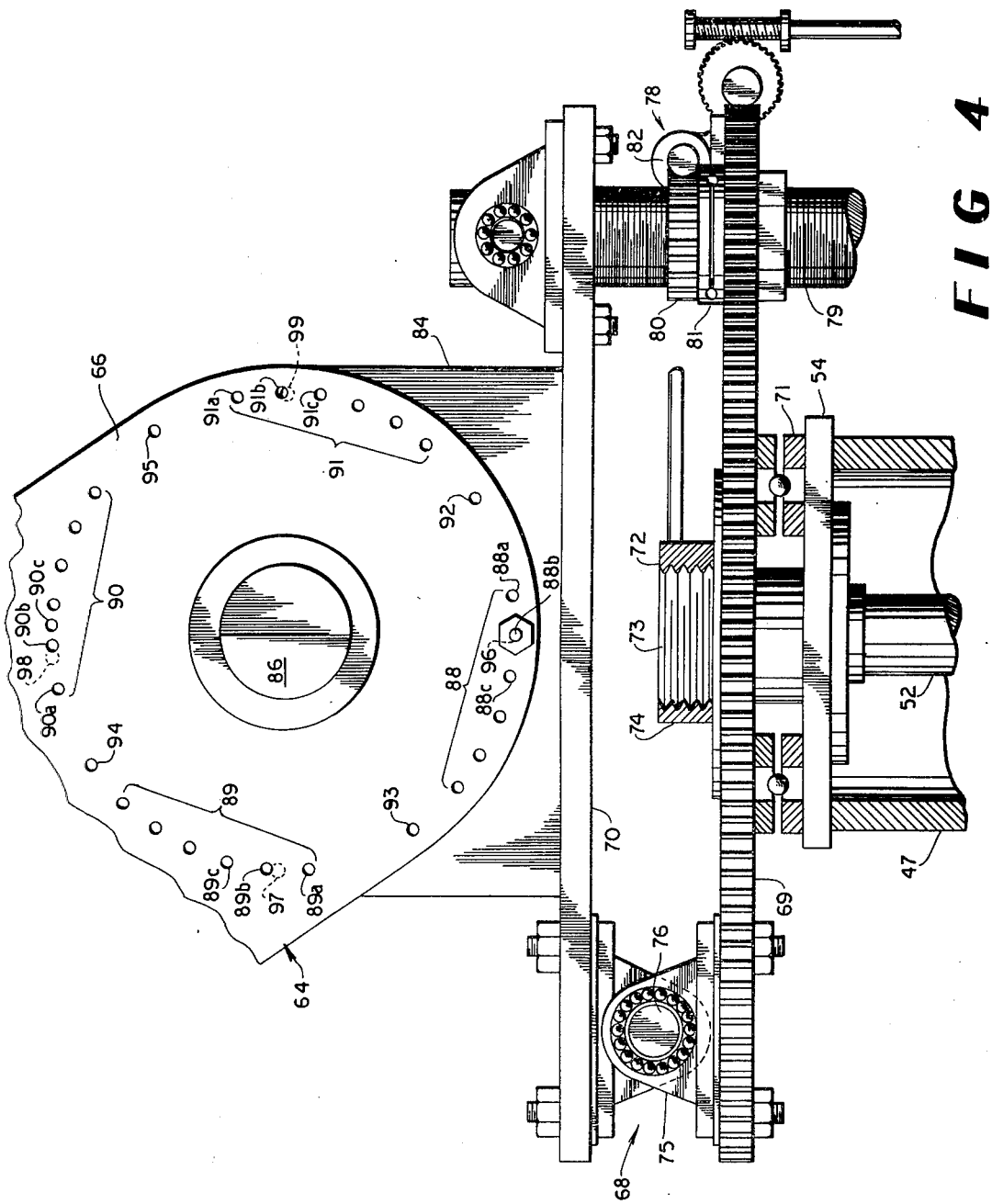
FIG. 4 is a detail illustration of the latitude adjustment section of the support system.

As is illustrated in FIG. 4, at least one of the plates 66 and 67 of clevis assembly 64 defines a plurality of spaced-apart apertures oriented about pivot pin 86.

There are four groups of apertures 88, 89, 90 and 91. The apertures of each group are spaced apart at 10° intervals from the center of pivot pin 86, and the apertures of each group are offset from the apertures of the next adjacent group by 2½°; that is, aperture 92 is located at the zero position of plate 66, aperture 88a is at the 20° position, aperture 88b will be at the 30° position, aperture 88c will be at the 40° position, etc.; and aperture 89a will be at the 112½° position, aperture 89b will be at the 122½° position, and aperture 89c will be at the 132½° position, etc.; and aperture 90a will be at the 205° position, aperture 90b will be at the 215° position, aperture 90c will be at the 225° position, etc.; and aperture 91a will be at the 297½° position, aperture 91b will be at the 307½° position, etc. Also, apertures 93, 94 and 95 are located at the 90°, 180° and 270° positions. In at least one of the upstanding plates 84 and 85 of the upper support platform 70 apertures 96, 97, 98, and 99 are formed. Apertures 96–99 are formed at the 0, 90, 180 and 270 degrees positions about pivot pin 86.

The arrangement of the apertures of the plates of clevis assembly 64 and the plates of latitude adjustment section 68 are such that when a positioning pin is inserted through aperture 96 of the inner plate 84 of upper support platform 70 and one of the apertures of the group 88, clevis assembly 64 will be tilted at an angle of 10° or a multiple of 10° from the vertical. If the pin is inserted through aperture 97 and one of the apertures in the group 89, the clevis assembly 64 will be tilted 22½° or 22½° plus a multiple of 10° from the vertical. If a positioning pin is inserted through the aperture 98 and one of the apertures from the group 90, the clevis assembly 64 will be tilted 25° or 25° plus a multiple of 10° from the vertical. If a positioning pin is inserted through the aperture 99 and one of the apertures from the group 91, the clevis assembly 64 will be tilted 27½° or 27½° plus a multiple of 10° from the vertical. Thus, the mating plates of the clevis assembly and the latitude adjustment section form a coarse adjustment assembly for tilting clevis assembly 64 at predetermined angles, at intervals of 2½° about the center of pivot pin 86.

Once the coarse adjustment has been made, a fine adjustment can be made with fine adjustment assembly 78 by rotating elevating ring 80 about its elevating screw 79 to tilt upper supporting platform 70 with respect to lower support platform 69 about hinge pin 76. It should be noted that the longitudinal axis of hinge pin 76 is parallel to the longitudinal axis of pivot pin 86 of clevis assembly 64. Thus, the pivoting of clevis assembly 64 about its pivot pin 86 or about hinge pin 76 will be in the same plane, a plane normal to the longitudinal axis of hinge pin 76 and pivot pin 86.

Polar axis shaft case 62 is slidable longitudinally through clevis assembly 64, while polar axis shaft 61 is rotatably received in polar axis shaft case 62. Polar axis shaft ram 100 has its housing connected to clevis assembly 64, and its ramrod 101 is connected to a bracket 102. Bracket 102 is connected to polar axis shaft case 62 and polar axis shaft ram 100 thus functions as a moving means for moving polar axis shaft case 62 longitudinally through clevis assembly 64. If desired, additional lengths of ramrod can be fastened to the ramrod 101 so that the polar axis shaft case 62 can be distended a further distance through the clevis assembly 64.

Polar axis shaft 61 is rotatable about its own longitudinal axis within shaft case 62. Worm gear 104 is rigidly connected to the polar axis shaft 61, and motor driven worm 105 engages the worm gear 104 so that the polar axis shaft is provided with a power assist for its rotation.

Declination axis shaft case 60 is rigidly connected to polar axis shaft 61 and is therefore rotatable with the polar axis shaft with respect to the polar axis shaft case 62. Declination axis shaft 59 is rotatably received within declination axis shaft case 60, and worm gear 106 and motor driven worm assembly 107 function to provide a power assist to the rotational movement of the declination axis shaft 59.

The telescope mounted on the portable support means can be constructed in accordance with various design arrangements, including those with the image of the object being projected parallel to the longitudinal sight axis of the telescope or through a side opening in the telescope housing. In the embodiment illustrated in the drawing, telescope 11 comprises elongated tubular housing 58 which rests in annular telescope seat assembly 109 at one end of declination axis shaft 59. The bearing assembly within annular seat assembly 109 allows housing 58 to rotate about its longitudinal sight axis 110. Housing 58 is open at one end 111 and apertured primary mirror 112 is mounted in the other end 114. Secondary mirror assembly 115 is located near end 111 of housing 58. Secondary mirror assembly 115 includes two mirrors, the first mirror being a hyperbolic mirror for receiving the image from primary mirror 112 and directing it back through the center opening 116 of primary mirror 112 and the opening 117 in the end 114 of housing 58 and focusing the image beyond the housing, thus creating a Casagrain focus. Housing 58 also defines side opening 118, and mirror assembly 115 is adjustable to remove the hyperbolic mirror from its reflecting position and support a second mirror of flat elliptical configuration into its reflecting position so that the image from primary mirror 112 can be directed through side opening 118 to focus outside the side of the housing, thus providing a Newtonian focus. Of course, various optical attachments can be connected to housing 58 to receive the images from the telescope.

Since telescope 11 is positioned on one side of polar axis shaft 61, the telescope is off balance and tends to rotate about the polar axis shaft. In order to balance the telescope on the polar axis shaft, weights 119 are attached to the end of declination axis shaft 59 at a distance from the polar axis shaft so as to balance the telescope on the polar axis shaft. If the net weight of a telescope and its various optical attachments, etc., is increased or reduced, the weights 119 can be threaded along the external threads at the ends of declination axis shaft 59 so as to move closer or further away from polar axis shaft 61, or one or more of the weights can be taken away from or added to the weights 119.

Since both the weights 119 and the telescope are located to one side of clevis assembly 64, the telescope tends to tip or pivot downwardly about the clevis assembly. Weights 120 are therefore added to the end of polar axis shaft 61 on the opposite side of clevis assembly 64 so as to balance the telescope about the clevis assembly. The weights 120 can be moved along the length of polar axis shaft 61 so as to compensate for added or reduced net weight of the telescope or its counterweights 119, or additional weights can be added to or removed from the weights 120. Thus, weights 120 and 119 function as counterweights to balance the telescope with respect to the support assembly.

Figure 5:
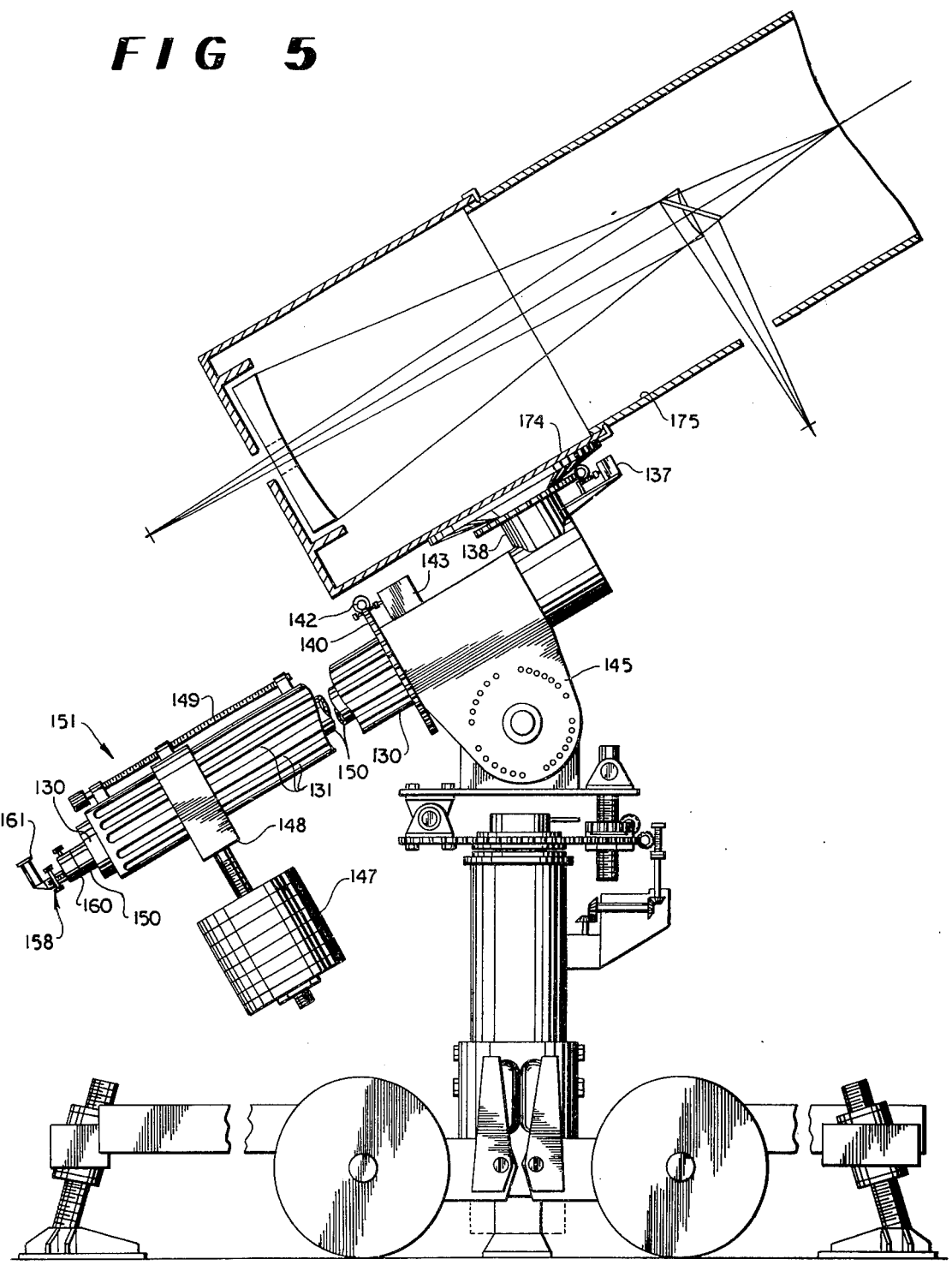
FIG. 5 is a side elevational view of a modified form of the invention.
Figure 6:
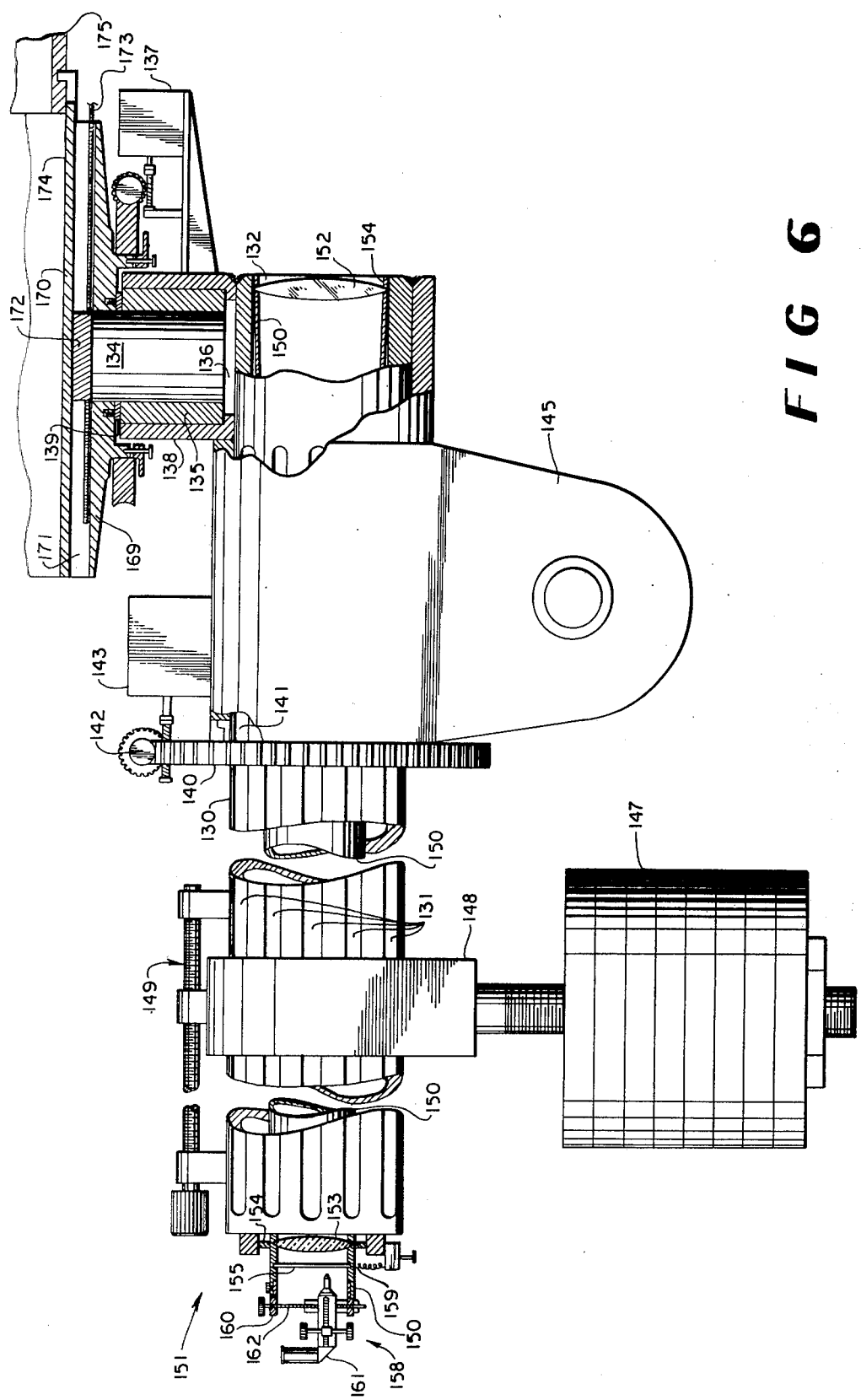
FIG. 6 is a partial illustration of the modified form of the invention, showing the Polaris sighting system of the polar axis shaft.

As is illustrated in FIGS. 5 and 6, wherein a modified form of the invention is disclosed, the polar axis shaft assembly can comprise a hollow tube 130 which defines a plurality of spaced-apart aligned grooves 131 extending along its length on its external surface and a rectilinear opening 132 extending along its length from end to end. In order that the opening 132 be unencumbered by a declination axis shaft such as shaft 59 of FIG. 1, the declination axis shaft 134 is mounted on the surface of polar axis tube 130 by means of socket 135 surrounding the axis shaft 134. Flange 136 at the end of axis shaft 134 adjacent polar axis tube 130 is located behind socket 135, and housing 138 and its hold-down rim 139 function to hold socket 135 in the position illustrated. Declination axis shaft 134 is therefore free to rotate about an axis normal to the longitudinal axis of polar axis tube 130. Drive mechanism 137 which comprises a motor, worm and worm gear, is attached to and drives declination axis shaft 134.

The upper end of declination axis shaft 134 is connected to a carriage assembly which includes a cradle 169 and a crescent-shaped saddle 170. The telescope housing 174 is held by the saddle. A slot 171 is formed in the bottom surface of said cradle 169 and extends along the length of said cradle. A rectilinear key 172 protruding from the saddle 170 fits into an is movable along the length of the slot, and travel screw 173 is threaded through an internally threaded bore through the key. Thus, when the travel screw 173 rotates, the saddle 170 moves parallel to the optical axis of the telescope.

Since the telescope-saddle movement construction causes the telescope housing 174 to be nonrotatably supported in its saddle, the forward portion 175 of housing 174 is constructed so as to be rotatable with respect to the rest of the housing and the opening (not shown) for the Newtonian focus can be rotated to a convenient position.

Worm gear 140 is connected to polar axis tube 130 by one or more keys 141 placed in aligned grooves of the polar axis tube and the inner rim of the worm gear 140 so that worm gear 140 is non-rotatably held to polar axis tube 130 but is slidable along the length of the polar axis tube. Worm 142 which is driven by motor 143 functions to rotate worm gear 140 and polar axis tube 130 about the longitudinal axis of the polar axis tube and with respect to clevis assembly 145. Motor 143 is mounted upon the clevis assembly 145, and polar axis tube 130 is free to rotate within the clevis assembly 145. Counterweight assembly 147 is connected to polar axis tube 130 and can be moved along the length of a polar axis tube by means of a travel screw arrangement 149. While the counterweight assembly 147 is movable along the length of polar axis tube 130, mating slots in the supporting sleeve 148 of the counterweight assembly and the external surface of the polar axis tube together with a key (not shown) inserted in the mating slots prevent the counterweight assembly 147 from rotating with respect to the polar axis tube. Thus, the weights of counterweight assembly 147 are always maintained on the opposite side of the polar axis shaft from the telescope housing 174. This provides torsional balance about the polar axis as well as longitudinal balance about the clevis axis.

The polar telescope assembly 151 is embodied as an integral part of the polar axis tube 130. Inner tube 150 which is conical shaped is located inside the polar axis tube 130 and functions as the telescope housing. A first large lens 152 is placed at the opening 154 of the inner tube which is adjacent the decliantion axis shaft 134, and the second small corrector lens 153 is placed at the remote opening. Inner tube 150 is supported at its end adjacent the clevis assembly 145 by polar axis tube 130, and its remote end, which is smaller, is supported by bushings 154; thus, when polar axis tube bends or twists, inner tube 150 will not be affected and will tend to remain rectilinear.

Figure 7A:
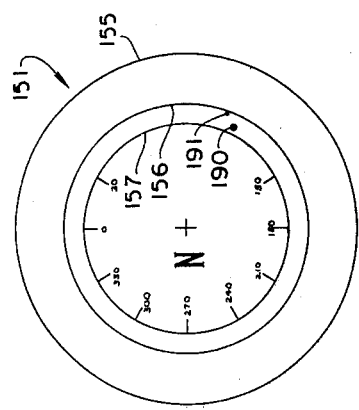
FIG. 7a is a schematic illustration of the face of the polar telescope when the polar axis shaft is aligned with the earth's polar axis.
Figure 7B:
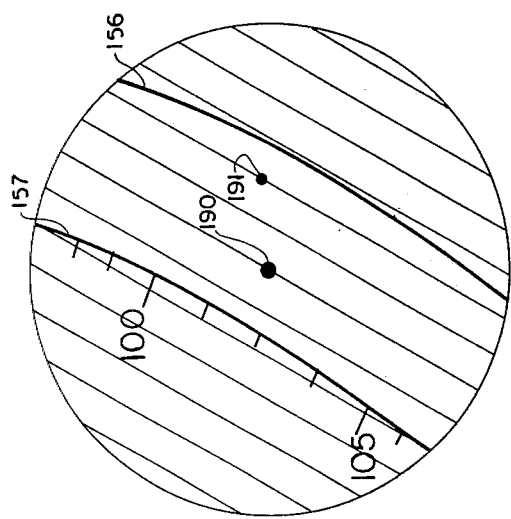
FIG. 7b is a schematic illustration of the image received when looking through the microscope attached to the polar telescope.

A flat lens 155 is positioned closely adjacent lens 153, and as illustrated in FIG. 7A, the flat lens 155 has a pair of circular scribe lines 156 and 157 and a compass rose imposed thereon. Microscope assembly 158 is located behind flat lens 155 and has a measuring scale lens (not shown) which provides an image as illustrated in FIG. 7B. Lens 153 and flat lens 155 are maintained in the end of the inner tube 150 and microscope support cylinder 160 mates with the end of inner tube 150 and holds the microscope assembly in its proper position. Microscope support cylinder is rotatable with respect to inner tube 150 so that the microscope 161 can be revolved about flat lens 155 so as to determine right ascention of Polaris and its companion star. Travel screw 162 provides for movement of the microscope 161 normal to the polar telescope. Flat lens 155 is illuminated with an edge light 159 so that the scribe lines can be observed. Polar telescope 151 is used to align the polar axis tube 130 with the polar axis of the earth and when the polar axis tube is aligned with the earth, the polar telescope functions as a sidereal clock and a means for determining the right ascension of Polaris and its companion star.

Figure 8:
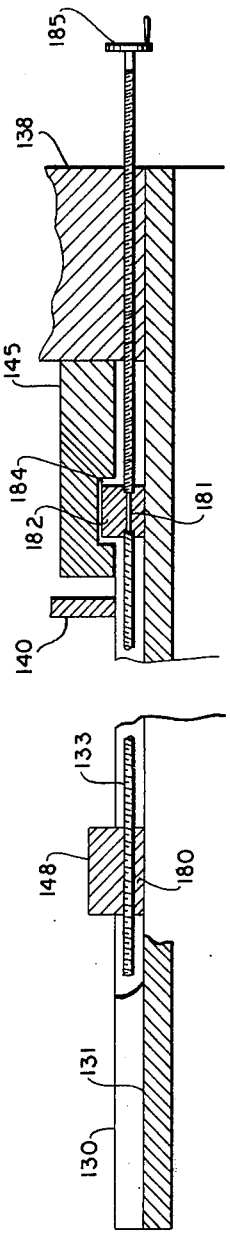
FIG. 8 is a detail illustration of the double threaded travel screw arrangement for moving the telescope and its counterweights in opposite directions along the polar axis shaft.

As is illustrated in FIG. 8, an alternate arrangement can be used to move the counterweight assembly 147 along the longitudinal axis of the polar axis shaft. One of the longitudinal grooves 131 of the polar axis tube 130 has a travel screw 133 located therein so that the travel screw is recessed from the outside periphery of the polar axis tube 130. The inwardly projecting key 180 of the supporting sleeve 148 of the counterweight assembly 147 defines an internally threaded bore through which one end of the externally threaded travel screw 133 extends. The opposite end of the travel screw 133 which has external threads of reverse pitch extends through an internally threaded bore of the declination axis shaft housing 138. A central unthreaded portion 181 of the travel screw 133 is received in a nonthreaded circular bore of sleeve or socket 182. Sleeve 182 is confined in annular groove 184 which is defined on the internal surface of clevis assembly 145 and extends around polar axis tube 130. The arrangement of the annular groove 184 is such that sleeve 182 is free to revolve about the longitudinal axis of the polar axis tube upon the rotaion of polar axis tube 130 with respect to clevis assembly 145 in the confines of annular groove 184. Travel screw 133 can be rotated by any conventional means, as by crank 185, and upon its rotation, the supporting sleeve 148 of the counterweight assembly will be moved in one direction toward or away from the clevis assembly while the polar axis tube 130 will be moved in the opposite direction along its length through the clevis assembly. Thus, when the polar axis tube 130 is moved in one direction over the fulcrum of clevis assembly 145, the counterweight assembly will be moved in the opposite or offsetting direction. The threads at one end of the travel screw are right-handed threads and at the other end are left-handed threads to cause movements in opposite directions by the counterweight assembly and polar axis tube, and the threads are also of different axial pitch so that the counterweight assembly 147 will move through a shorter distance than the polar axis tube 130. This arrangement is desirable because of the difference in the weights and lever arm distances from the fulcrum of the clevis of the telescope housing and the counterweight assembly.

Figure 9:
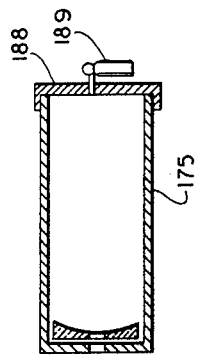
FIG. 9 is a schematic illustration of the telescope housing and its closure cap assembly.

As is illustrated in FIG. 9, a cap 188 is provided to close the open end of the telescope housing. A source of inert gas 189, such as nitrogen, is connectable to cap 188 and arranged to inject gas through an opening in the cap into the confines of the housing. The air in the confines of the housing will tend to be displaced from the housing through the opening in the opposite end of the housing. After the confines of the housing have been substantially filled or charged with the inert gas, the opening at the opposite end of the housing can be closed to substantially seal the inert gas within the housing. The absence of oxygen in the gas within the confines of the housing substantially reduces deterioration of the mirror surfaces and therefore significantly reduces the frequency of restoring the mirror surfaces. The primary mirror of the disclosed embodiment of the telescope is 24 inches in diameter and the diameters of the primary mirror of other embodiments of the invention exceed 18 inches in diameter. The mirror is therefore heavy and cumbersome and subject to damage by vibration or radical temperature changes, etc. Thus, the reduction of the frequency of restoration of the mirror surfaces also reduces the exposure of the mirror to accidental damage due to the extraction of the mirror from the telescope housing and transportation to and from the location where the mirror surfaces are to be restored.

The housing of the telescope preferably will be fabricated from nonmetallic material, such as molded fiberglass and resin, and the internal metal components within the housing will be coated with a similar substance, such as chopped fiberglass mixed with resinous binder. The material is selected for its insulating qualities so as to reduce the heat transfer due to conduction and radiation within the telescope housing, thereby maintaining the image integrity.

OPERATION

When the telescope assembly is to be transported between erection sites, the support feet 21a will be retracted so that the wheels 19 are in engagement with the ground and fully support the telescope assembly. Telescoping pier assembly 45 is retracted so that the telescope is located close to support frame 13, clevis assembly 64 is pivoted to its upright attitude, and polar axis shaft 61 is rotated so that declination axis shaft 59 is oriented in a vertical plane with the telescope in the low position. Upper tubular pier member 47 is rotated to align the telescope 11 with the longitudinal centerline of portable support means 12. The counterweights are adjusted so that they properly balance telescope 11 with respect to clevis assembly 64, and all movable elements of the assembly are rendered immovable by the tightening of various setscrews, lock bolts, etc., and with the use of tie-downs, braces, etc. (not shown). Also, a water-resistant shroud may be employed to cover the entire telescope assembly and various lens covers, motor covers, etc. can be used as desired to protect the assembly. The inside of the main telescope will be kept dry by the insertion of a drying gas.

As the portable telescope assembly is being transported, the pneumatic tires 19, compression bags 34 between the L-shaped pivot plates 30, and the compression bags 40 between the lower and upper support rings 38 and 39 function to isolate the shocks and vibrations received in the lower portion of the telescope assembly.

When the telescope assembly reaches its site of erection, support feet 21a, 21b and 21c are lowered by loosening lock rings 26 and rotating elevating rings 25 to urge the support feet downwardly against the ground and lift the support frame in an upward direction. The supprt frame is leveled by finally adjusting the elevating rings 25 of the three support feet 21a, 21b and 21c, and all the tie-downs, set screws and other lash-down elements are removed to free the moving parts of the assembly.

Hydraulic jack 51 is positioned internally of the telescoping pier assembly 45, and when operated the jack shaft 52 extends upwardly through the telescoping pier assembly to lift the upper inner tubular pier member 47 with respect to the lower tubular pier member 46. When properly elevated, the supporting screw 55 can be inserted through the lower tubular pier member 47 to support the upper tubular pier member 46. In most situations, the latitude at which the telescope assembly is erected is known and the operator can choose the setting of clevis assembly 64 which is closest to the latitude of the particular site. For instance, if the latitude is 41½° North, the clevis assembly 64 is rotated until aperture 89c is aligned with aperture 97, which sets the polar axis shaft 61 at an angle with respect to the vertical which is 42½°. Motor driven worm gear 82 of fine adjustment assembly 78 is then operated to pivot upper support platform 70 downwardly with respect to lower support platform 69 about hinge pin 76 until the setting of the polar axis shaft has been altered from 42½° to 41½°. Lower support platform 69 is then rotated by means of its motor driven worm 49 engaging and rotating lower support platform 69 which functions as a worm gear, until the polar axis shaft is trained around and is approximately parallel to the earth's polar axis. The fine setting of the polar axis shaft can be accomplished by sighting through the polar telescope 151 or hollow polar axis shaft telescope of that embodiment illustrated in FIGS. 5 and 6 or with an attached telescope (not shown) in the embodiment illustrated in FIGS. 1–4, so that the North Star is located and the polar axis shaft is then oriented with respect to the North Star to finally adjust its polar axis. The rotational training movements of the polar axis shaft are allowed when lock nut 74 on the top surface of lower support platform 69 is loose, and when the telescope is trained the lock nut will be tightened to lock the assembly in the proper position. Likewise, fine adjustment assembly 78 is utilized to modify the elevation of the polar axis shaft 61.

When the polar telescope 1551 is utilized to align the polar axis tube 130 parallel to the polar axis of the earth, Polaris or the North Star 190 (FIG. 7a) will be first centered in the view of the polar telescope 151. When Polaris is first observed, its companion star will also be seen since there is an 18 second arc separation between the two stars. Since the earth's polar axis is not aimed directly at Polaris, the polar axis shaft 130 must be offset from Polaris in a direction and through an arc of separation which is the same as the declination and a direction opposite to the declination of Polaris. The declination of Polaris is approximately 58 minutes. The focal length of the polar telescope 151 together with the radius of inner circle 157 of flat lens 155 is such that the radius of the circle 157 appears to be equal to the declination of Polaris 190 from true North at the focal length of the telescope. Thus, as is illustrated in FIG. 7A, if the polar telescope 151 is aimed at true North, or parallel to the earth's polar axis, Polaris 190 will appear at and appear to move along the inner scribe line 157 and the compass rose will provide a sidereal clock indication.

The companion star 191 is at a position angle of 217° from true North through Polaris. The declination of the companion star is matched with the radius of the outer scribe circle 156 and the focal length of the polar telescope so that when the polar telescope is aimed at true North, the companion star 191 will be merged with and appear to move along the outer scribe line 156.

When the polar axis tube 130 is being aligned with true North, an observation of Polaris 190 and its companion star 191 can be made to determine where true North is by the 217° position angle between the line of intersection between the companion star and Polaris and Polaris and true North. Once the stars are imposed on the scribe lines in the manner illustrated in FIGS. 7A and 7B, the polar axis shaft 130 is aligned with true North.

Because of the precession and nutation of the earth on its polar axis, the declination and right ascension of Polaris varies. Because of the varying declination, there will be times when Polaris 190 will not appear directly on the inner scribe line 157 when the polar axis shaft is aligned with true North. In order to properly align the polar axis shaft, the lens of the microscope 161 has imposed thereon a scale, such as the scale of FIG. 7b, in order to position Polaris 190 the proper distance away from the inner circular scribe line 157. By the use of proper tables, the current declination of Polaris can be determined, and since the apparent declination of inner scribe line 157 is known, the measuring scale of the microscope can be used to offset Polaris from the scribe line 157 the proper distance to align the polar axis shaft with true North. The outer circular scribe line 156 will be at an apparent declination slightly greater than the greatest declination of the companion star 191. Thus, the proper positioning of Polaris between the scribe lines 157 and 156 can also be determined by the distance of the companion star 191 from its scribe line 156. Of course, while a parallel line scale is illustrated in FIG. 7B as being the scale utilized for the foregoing purpose, it should be obvious that various other scale images can be imposed on the microscope.

When a polar axis shaft 61 or 130 has been oriented so that it forms a polar axis which is parallel to the earth's polar axis, the telescope 11 can be rotated or revolved about the polar axis during its sighting and tracking moves. For instance, telescope 11 can rotate with declination axis shaft 59 about an axis which intersects and is perpendicular with respect to the polar axis of the telescope assembly by the operation of motor driven worm assembly 107 and its worm gear and the telescope can revolve about the polar axis by the operation of motor driven worm 105 and its engagement with its worm gear 104 on the polar axis shaft. The motors of the telescope assembly are variable speed motors.

When the telescope housing 58 revolves about the polar axis of the telescope assembly, it may be necessary to move the telescope upwardly by moving the polar axis shaft case 62 through the clevis assembly 64 so that the telescope is free to revolve completely around the polar axis and its full rotation will not be obstructed by engaging any portions of the telescoping pier assembly, support frame, etc. This is accomplished by the operation of polar axis shaft ram 100 at the top of clevis assembly 64 which causes the polar axis shaft case 62 to move upwardly through the clevis assembly 64.

During the movement of the telescope about its polar axis, the telescope will be counterbalanced about clevis assembly 64 by weight assembly 120. Also, as various sighting equipment, photographic equipment, etc. is attached to the telescope 11, the weight assembly 120 can be moved along the polar axis shaft 61 as necessary to counterbalance the added or reduced weight from the telescope 11. In addition, additional weight can be added to the weight assembly 120, if desired.

As the telescope 11 revolves about the polar axis of the assembly, the position of the Newtonian focus may become inconvenient to the operator. Housing 58 can then be rotated about its slight axis 110 and the position of the Newtonian focus can be adjusted without interfering with the alignment of the Casagrain focus or otherwise disturbing the position of the assembly.

While this invention has been described in detail with particular reference to preferred embodiments thereof, it will be understood that variations and modifications can be effected within the spirit and scope of the invention as described hereinbefore and as defined in the appended claims.

I claim:

1. A portable telescope assembly comprising portable support means, a polar axis shaft mounted on said portable support means, means for rotating said polar axis shaft with respect to said portable support means about a vertical axis and for tilting said polar axis shaft intermediate its ends about a horizontal axis to orient the polar axis shaft parallel to the axis of rotation of the earth, a declination axis shaft mounted on one end of said polar axis shaft and extending perpendicular to said polar axis shaft, a telescope displaced from one side of said polar axis shaft and mounted on said declination axis shaft with its sight axis perpendicular to said declination axis shaft, means for revolving said telescope and said declination axis shaft about said polar axis shaft and for rotating said telescope on said declination axis shaft while maintaining the sight axis of telescope in a plane parallel to said polar axis shaft, a counterweight assembly mounted on said polar axis shaft and including removable weights positioned on the side of said polar axis shaft opposite to said telescope and on an end portion of said polar axis shaft opposite to said telescope to balance said telescope about the longitudinal axis of said polar axis shaft and about said horizontal axis, the weight of said counterweight assembly being movable along the length of the polar axis shaft and toward and away from the polar axis shaft.

2. The portable telescope assembly of claim 1 and wherein said means for tilting said polar axis shaft intermediate its ends comprises a horizontally extending support axle supported by said support means, said telescope being pivotally mounted on said support axle and arranged to pivot in a vertical plane, means for locking said telescope with respect to said support axle at predetermined angular elevations about said support axle, and means for revolving said support axle about an axis displaced from and parallel to said support axle to finely adjust the elevation of said telescope about said support axle.

3. The portable telescope assembly of claim 1 and further including means for moving said telescope along its axis of revolution about said polar axis shaft.

4. The portable telescope assembly of claim 1 and wherein the external surface of said polar axis shaft includes a plurality of aligned grooves extending along its length, and wherein said counterweight assembly includes a supporting sleeve mounted on said polar axis shaft and including a key extending into at least one of said grooves to hold said counterweight assembly in a non-rotational relationship with respect to said polar axis shaft while permitting said counterweight assembly to move along the length of said polar axis shaft.

5. The portable telescope assembly of claim 1 and wherein the external surface of said polar axis shaft includes at least one groove extending along its length, and wherein said means for rotating said polar axis shaft with respect to said portable support means about a vertical axis and for tilting said polar axis shaft intermediate its ends about a horizontal axis includes a worm gear mounted about said polar axis shaft and keyed to said groove in a non-rotational relationship with said polar axis shaft, a clevis assembly extending about said polar axis shaft adjacent said worm gear, a worm mounted on said clevis assembly and engaging said worm gear whereby when said worm is rotated the worm gear and polar axis shaft rotate in said clevis assembly.

* * * * *